US009687108B2

(12) United States Patent
Swerchesky

(10) Patent No.: US 9,687,108 B2
(45) Date of Patent: Jun. 27, 2017

(54) BEVERAGE MACHINE CARTRIDGE HOLDER WITH DAMPED MOVEMENT

(71) Applicant: Keurig Green Mountain, Inc., Waterbury, VT (US)

(72) Inventor: Joel Swerchesky, Derry, NH (US)

(73) Assignee: Keurig Green Mountain, Inc., Waterbury, VT (US)

( * ) Notice: Subject to any disclaimer, the term of this patent is extended or adjusted under 35 U.S.C. 154(b) by 307 days.

(21) Appl. No.: 14/326,528

(22) Filed: Jul. 9, 2014

(65) Prior Publication Data
US 2015/0013279 A1    Jan. 15, 2015

Related U.S. Application Data

(60) Provisional application No. 61/844,681, filed on Jul. 10, 2013.

(51) Int. Cl.
| | | |
|---|---|---|
| *A47J 31/40* | (2006.01) | |
| *A47J 31/44* | (2006.01) | |
| *A47J 31/36* | (2006.01) | |

(52) U.S. Cl.
CPC ......... *A47J 31/407* (2013.01); *A47J 31/3633* (2013.01); *A47J 31/3638* (2013.01); *A47J 31/4403* (2013.01); *A47J 31/3676* (2013.01)

(58) Field of Classification Search
CPC ............... A47J 31/3633; A47J 31/3638; A47J 31/3623; A47J 31/3676
USPC ................................................ 99/289 R, 295
See application file for complete search history.

(56) References Cited

U.S. PATENT DOCUMENTS

| | | | | |
|---|---|---|---|---|
| 7,322,274 | B2 * | 1/2008 | Wang ................. | A47J 31/4407 99/280 |
| 7,513,192 | B2 * | 4/2009 | Sullivan .............. | A47J 31/3695 99/279 |
| 2010/0192779 | A1 * | 8/2010 | Tanner ................ | A47J 31/3695 99/295 |
| 2013/0047863 | A1 | 2/2013 | Larzul et al. | |
| 2014/0342067 | A1 * | 11/2014 | Sullivan .............. | A47J 31/3633 426/425 |
| 2014/0373724 | A1 * | 12/2014 | De'Longhi ......... | A47J 31/3614 99/289 R |

(Continued)

FOREIGN PATENT DOCUMENTS

| | | |
|---|---|---|
| EP | 1 842 467 A2 | 10/2007 |
| WO | WO 2007017455 A1 | 2/2007 |

OTHER PUBLICATIONS

International Search Report and Written Opinion dated Sep. 4, 2014 from corresponding PCT Application No. PCT/US2014/045944.

*Primary Examiner* — Reginald L Alexander
(74) *Attorney, Agent, or Firm* — Wolf, Greenfield & Sacks, P.C.

(57) ABSTRACT

A method and apparatus for opening and closing a cartridge holder of a beverage forming machine. The cartridge holder may have an opening arranged to receive and hold a cartridge with the cartridge holder in an open position, e.g., the opening may face a front of the beverage forming machine and be in an upwardly inclined position in the open position. A cam and cam follower may cause the cartridge holder to pivot and move to a closed position, e.g., in which the opening of the cartridge holder is in a downwardly inclined orientation. Rotation of the cartridge holder may be damped in at least a portion of movement between the open and closed positions.

17 Claims, 10 Drawing Sheets

(56) References Cited

U.S. PATENT DOCUMENTS

2015/0150407 A1* 6/2015 Bugnano ............ A47J 31/3638
426/431

* cited by examiner

BEVERAGE MACHINE CARTRIDGE HOLDER WITH DAMPED MOVEMENT

CROSS REFERENCE TO RELATED APPLICATION

This application claims the benefit of U.S. Provisional Application No. 61/844,681, filed Jul. 10, 2013, which is hereby incorporated by reference in its entirety.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

Aspects of the invention relate to methods and apparatus for opening and closing a cartridge holder of a beverage forming machine. In some embodiments, the cartridge holder may have an opening arranged to receive and hold a cartridge with the cartridge holder in an open position, e.g., the opening of the cartridge holder may face a front of the beverage forming machine and be in an upwardly inclined position in the open position. Such an orientation may make placement of a cartridge in the holder easy and convenient for a user, e.g., the holder may securely hold the cartridge while in the open position. A pivot pin of the cartridge holder may be moved along a linear or other translational path, e.g., along a slot of the machine frame, and in response, a cam and cam follower may cause the cartridge holder to pivot and move to a closed position, e.g., in which the opening of the cartridge holder is in a downwardly inclined orientation. This simplified arrangement may provide for both pivotal movement of the cartridge holder (e.g., needed for some cartridge arrangements) as well as linear or other translational movement (e.g., needed to clamp a cartridge between the cartridge holder and a lid or cover) between the open and closed positions.

In one aspect of the invention, a beverage forming apparatus includes a frame arranged to support components of the beverage forming apparatus, and a cartridge holder including an opening arranged to receive and hold a cartridge with the cartridge holder in an open position. The cartridge holder may include a pivot pin defining a pivot axis about which the cartridge holder is arranged to pivot between open and closed positions, e.g., between an upwardly inclined position in which the opening faces towards a front of the beverage forming machine and a downwardly inclined position. A cam and a cam follower may be engaged between the frame and the cartridge holder and be arranged to cause the cartridge holder to pivot about the pivot axis. For example, the cam may be fixed to the frame or the cartridge holder, and the cam follower may be fixed to the other of the frame or the cartridge holder. In some arrangements, movement of the cartridge holder pivot pin along the translational path may cause the cam and cam follower to move relative to each other and cause the cartridge holder to pivot about the pivot axis. An actuator may be arranged to cause the cam follower to move along the cam and pivot the cartridge holder between the open and closed positions, e.g., by moving the pivot pin along the translational path. A damper may be engaged with the cartridge holder to damp rotation of the cartridge holder in movement of the cartridge holder between the open and closed positions. For example, a spring may be used to drive rotation of the cartridge holder toward the open position and damper may slow rotation of the cartridge holder toward the open position. Such damped movement may help maintain a cartridge engaged with the cartridge holder and/or help resist throwing liquid or other material from the cartridge holder that may be caused by rapid rotation.

In some embodiments, the actuator may include a handle pivotally movable relative to the frame to move the pivot pin of the cartridge holder along the translational path. For example, the machine may include a slider that is movable relative to the frame along a linear track, and that is attached to the pivot pin to move the pivot pin along the linear path as the slider moves along the linear track. The actuator may include a handle that is pivotally movable relative to the frame about a handle pivot axis, and have a drive pin that engages with a drive slot of the slider and moves the slider along the linear track with pivoting movement of the handle about the handle pivot axis. Thus, pivoting movement of the handle may cause the cartridge holder to move along the translational path, which causes pivoting of the cartridge holder due to interaction of the cam and cam follower.

In one embodiment, the cam includes an L-shaped cam groove fixed to the frame, and the cam follower is fixed to the cartridge holder. The cam follower may be positioned rearwardly of the pivot axis with the cartridge holder in the closed position (e.g., with the cam follower positioned along an upper portion of the L-shaped cam groove), and positioned below the pivot axis with the cartridge holder at the open position (e.g., with the cam follower in a downwardly extending portion of the L-shaped cam groove). The cartridge holder may also include a spring to bias the cartridge holder to pivot about the pivot axis toward the open position.

In another aspect of the invention, a method for controlling operation of a beverage forming machine includes causing a cam follower to move along a cam where the cam follower may be fixed to the frame or the cartridge holder, and the cam may be fixed to the other of the frame or the cartridge holder. The cartridge holder may be pivoted about a pivot axis defined by the pivot pin based on movement of the cam follower relative to the cam. Rotation of the cartridge holder about the pivot axis may be damped, e.g., to slow rotation of the cartridge holder when moving from the closed position to the open position and/or vice versa. In one embodiment, a handle or other actuator may move the pivot pin of the cartridge holder along a linear slot or groove, which causes the cam and cam follower to move relative to each other. This movement may cause not only translational movement of the cartridge holder, but also pivoting movement of the cartridge holder. In some arrangements, the cartridge holder may move only linearly, but not rotationally, in one phase of movement (e.g., near the closed position). This may allow for reliable piercing of the cartridge and withdrawal of the cartridge from piercing elements, if used. The cartridge holder may pivot in another phase of movement, e.g., near the open position, to present the cartridge holder in a way that allows for easy removal and placement of a cartridge.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
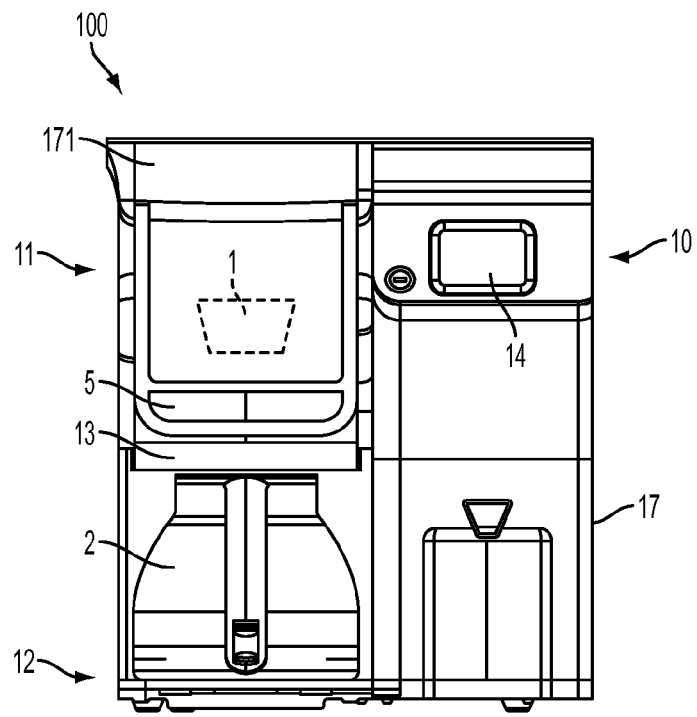
FIG. 1 is a front view of a beverage forming apparatus in an illustrative embodiment.
Figure 2:
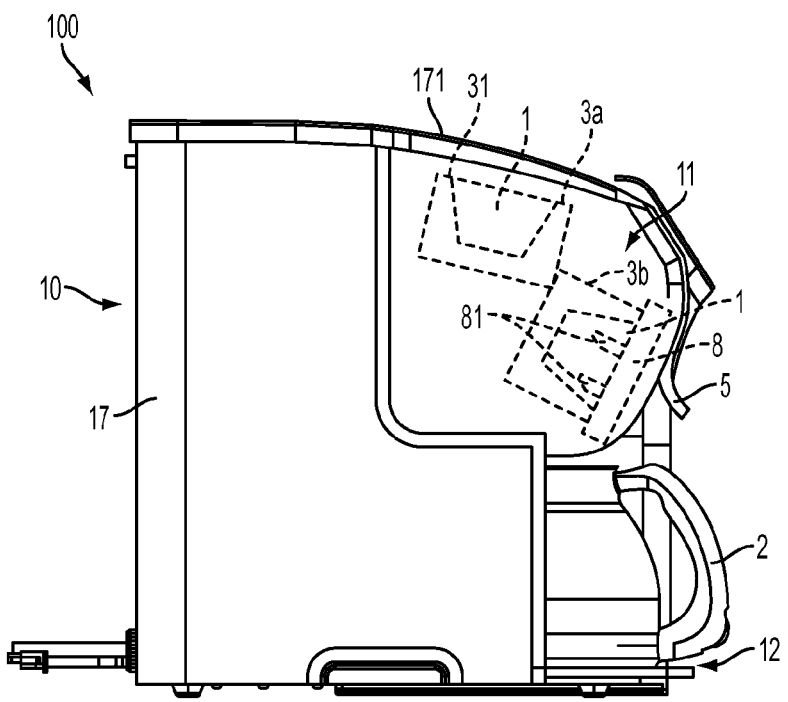
FIG. 2 is a left side view of the FIG. 1 embodiment showing the cartridge holder in open and closed positions.

FIGS. 1 and 2 shows a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a container 2. The cartridge 1 may be manually or automatically placed in a cartridge holder 3 of a beverage forming station 11 of the beverage forming machine 10. For example, the cartridge holder 3 may be exposed to receive the cartridge 1 when the user operates a handle 5 or other actuator. With the cartridge 1 placed in the cartridge holder, the actuator 5 may be operated to at least partially enclose the cartridge 1, e.g., so that water or other precursor liquid can be introduced into the cartridge 1 to form a beverage. For example, with the cartridge 1 held in the beverage forming station 11 by the cartridge holder 3, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in embodiments of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 may include any suitable materials to form a beverage, such as a carbon dioxide source used to carbonate water, a beverage mix, etc.

In this embodiment, the beverage forming machine 10 includes a housing 17 that houses and/or supports components of the machine 10, such as a user interface 14 used to control system operation, and defines a container receiving area 12 at which the container 2 is positionable to receive beverage dispensed by the machine 10 via a beverage outlet. Thus, at the container receiving area 12, the container 2 is associated with the machine 10 to receive a dispensed beverage and may be supported by the housing 17. The container 2 may be received at the container receiving area 12 so that the container 2 is at least partially surrounded by the housing 17, as shown in FIG. 2, or the container 2 may be more exposed when at the container receiving area 12.

In this embodiment, the apparatus 100 may include a container lid detector 13 that is arranged to detect whether a lid that covers an opening of the container 2 is in an open position or a closed position. For example, the lid detector 13 may include any suitable sensors to detect a lid's presence, such as magnetic, inductive, resistive, capacitive or other sensors used to detect a magnetic or other physical characteristic of a lid. In some embodiments, the beverage forming machine 10 may be controlled to dispense beverage from the beverage outlet 3 only if the container 2 is detected to have its lid in the open position. However, the machine 10 need not necessarily have a lid detector 13, and instead may make beverage whether the container 2 is suitably positioned at the container receiving area 12 or not.

In accordance with an aspect of the invention, a cartridge holder having an opening arranged to receive and hold a cartridge may be moved between an open position, e.g., in which the opening of the cartridge holder faces a front of the beverage forming machine and is in an upwardly inclined position, and a closed position, e.g., in which the cartridge is at least partially enclosed in a space for forming a beverage. Moving of the cartridge holder between the open position and the closed position may be performed by operating a handle or other actuator. For example, when a handle 5 is lifted from the position shown in FIG. 1, the cartridge holder 3 may be moved to an open position in which the opening of the cartridge holder 3 is oriented in a upwardly inclined position facing the front of the machine 10 (identified as 3a) and exposed for placement of a cartridge 1 in an opening 31 of the holder 3. In this upwardly inclined position, an axis that is perpendicular to the plane of the opening 31 may be arranged at an angle above the horizontal of about 25 to 85 degrees, e.g., about 45 degrees. Such an orientation may make placement of a cartridge in the holder easy and convenient for a user, e.g., the holder 3 may securely hold the cartridge 1 while in the open position. Movement of the handle 5 downwardly may move the cartridge holder 3 to a closed position (identified as 3b) in which the opening 31 of the cartridge holder 3 is in a downwardly inclined position. In the downwardly inclined position, an axis perpendicular to the plane of the opening 31 may be at an angle below the horizontal of 5 to 85 degrees, e.g., about 10-15 degrees. In this embodiment, inlet and outlet piercing elements 81 on a lid or cover 8 penetrate into the cartridge 1 to provide liquid into the cartridge 1 and allow beverage to exit the cartridge 1, although such an approach is not necessary.

Figure 3:
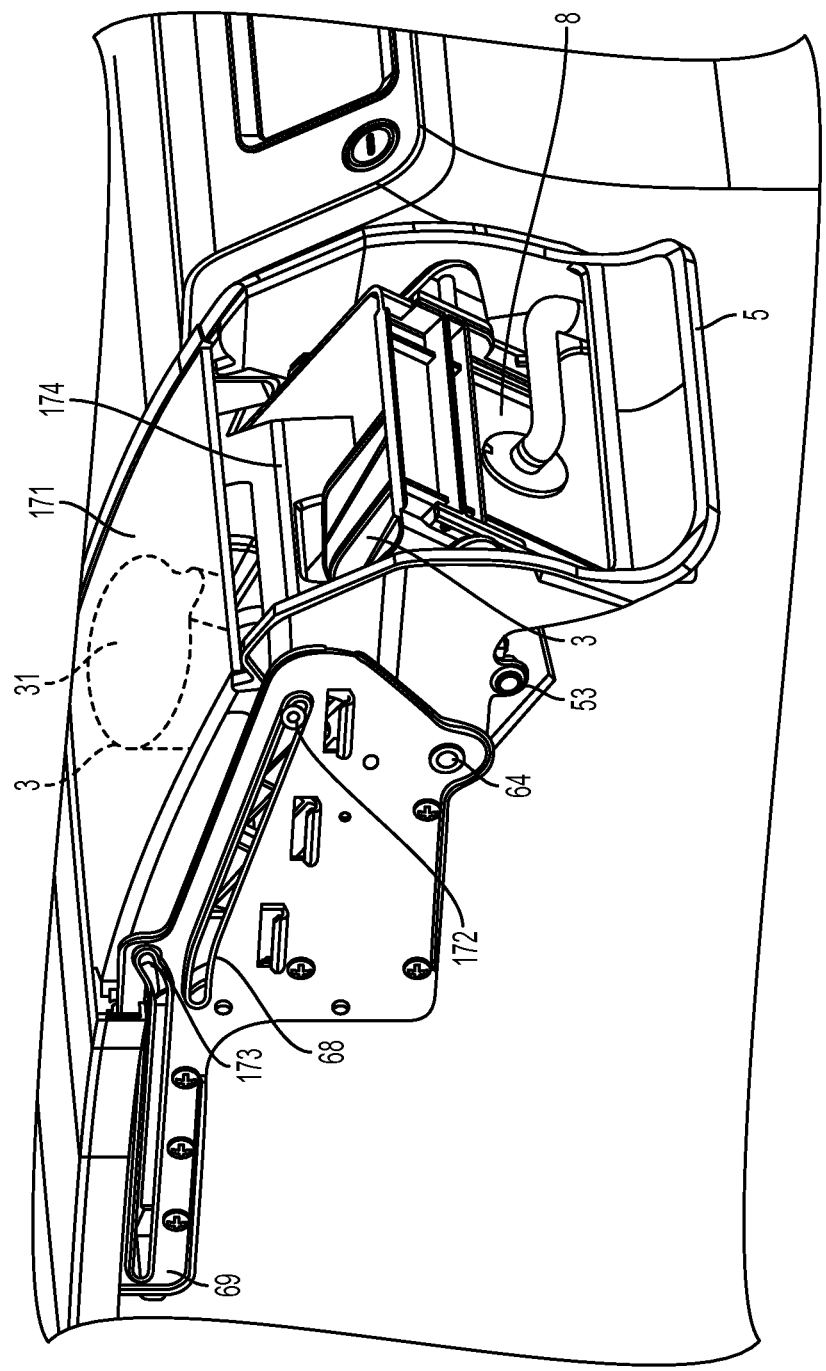
FIG. 3 is a left side perspective view in partial cut away of the FIG. 1 embodiment illustrating the cartridge holder in closed and open positions.

FIG. 3 shows a perspective view with some components of the beverage forming machine 10 removed from view for clarity. FIG. 2 shows the cartridge holder 3 and handle 5 in solid line in the closed position. However, with the handle 5 raised to an open position (not shown for clarity), the cartridge holder 3 is moved to the open to position shown in dashed line in FIG. 3. Movement of the handle 5 to the open position also causes a door 171 to slide rearwardly to expose a cavity in the housing 17 in which the cartridge holder 3 is located. The door 171 moves rearwardly along tracks 68 and 69 that engage pins 172, 173 of the door 171 and thus guide the door 171 in its movement. As is shown in more detail below, the door 171 is coupled to the cartridge holder 3 by a link 174 that drives the door 171 with movement of the cartridge holder 3. As can be seen in FIG. 3, the rear track 69 has a curved section at the forward end that moves the rear end of the door 171 downwardly as the cartridge holder 3 starts to move toward the open position and the door 171 moves rearwardly. As a result, the door 171 can be retracted under the top portion of the housing 17 as the door 171 moves to its open position. Similarly, movement of the handle 5 and cartridge holder 3 to the closed position draws the door 171 forward into the position shown in FIG. 3. The curved section of the rear track 69 causes the rear end of the door 171 to be lifted up in the last portion of the door's movement, positioning the door 171 so that it is flush with the housing 17 at the area where the rear portion of the door 171 meets the top portion of the housing 17.

In accordance with another aspect of the invention, the cartridge holder may include a pivot pin that is movable along a translational path, e.g., along a slot of the machine frame. With movement of the pivot pin along the translational path, a cam and cam follower may cause the cartridge holder to pivot as part of its movement between the open and closed positions. Accordingly, the cartridge holder mechanism may provide for both pivotal movement of the cartridge holder (e.g., to move the holder opening between upwardly inclined and downwardly inclined orientations) as well as translational movement (e.g., to clamp a cartridge between the cartridge holder and a lid or cover as well as to pierce the cartridge with inlet and/or outlet needles or other piercing elements). In this illustrative embodiment, the cartridge holder 3 carries a cam follower and a cam is attached to the frame 6, and a cartridge holder pivot pin is attached to a slider element which is moved along a linear track by the handle. Thus, handle movement causes the cartridge holder (and slider element) to move along a linear path, which causes the cam and cam follower to cause rotation of the cartridge holder, as is discussed in detail below. (Illustrative embodiments below are described with reference to linear movement of a pivot pin and/or a cartridge holder. It should be understood that aspects of the invention are not limited to such linear movement, but rather may involve other translational movement, e.g., movement along a somewhat curved path.)

Figure 4:
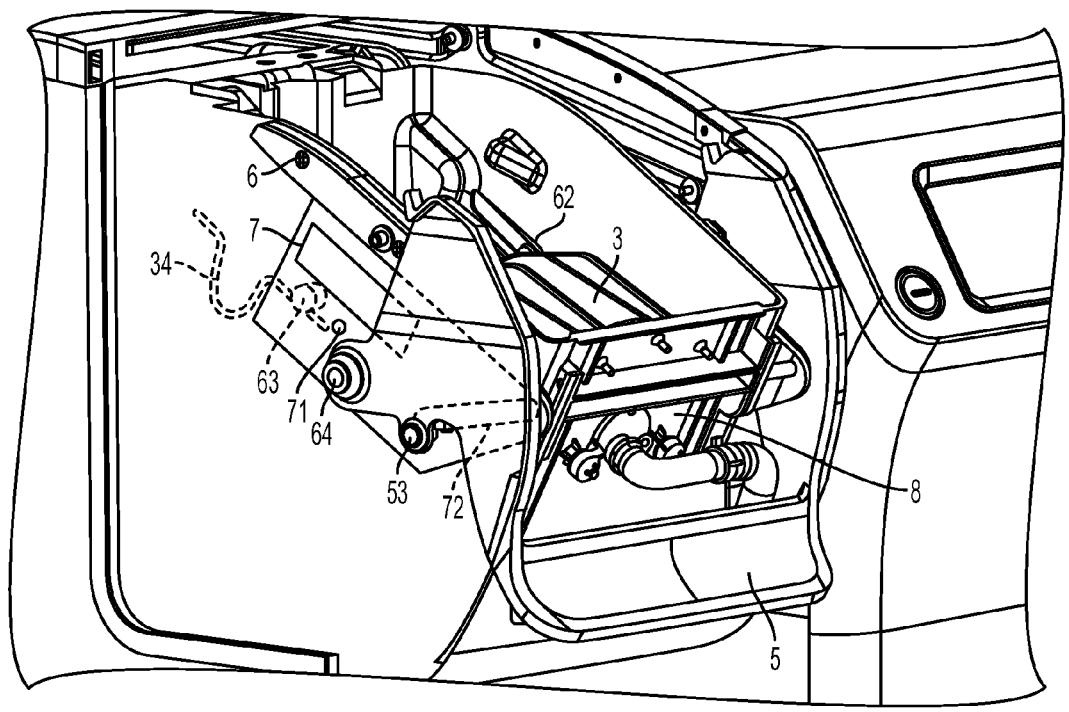
FIG. 4 is another left side perspective view illustrating portions of the cartridge holder mechanism.

FIG. 4 shows another view of this embodiment, again with further components removed for clarity. A slider 7 can be seen in this view, which engages with a pivot pin 33 of the cartridge holder 3 at a location 71. The pivot pin 33 extends through a slot 62 in the frame 6 to engage with the slider 7. (See the rear right side of the cartridge holder 3 in FIG. 4 to see the slot 62 on the right side of the holder 3. The left side slot 62 is not shown in FIG. 4 for clarity.) The slider 7 rides in a track of the frame 6 so that the slider 7 can move linearly along the direction of the slot 62. Thus, the pivot pin 33 of the cartridge holder 3 is moveable along a linear path defined by a first slot 62. The slider 7 is moved in its track by a drive pin 53 of the handle 5 that engages with a drive slot 72 of the slider 7. That is, as the handle 5 is rotated upwardly (counterclockwise as seen in FIG. 4) about a handle axis 64 (where the handle 5 is pivotally mounted to the frame 6), the drive pin 53 rides in the drive slot 72, pushing the slider 7 to move rearwardly relative to the frame 6. Similarly, downward movement of the handle 5 (clockwise rotation about the handle axis 64) engages the drive slot 72 to move the slider 7 forwardly. A spring assist may be employed to help move the slider 7 forwardly or rearwardly, if desired. The drive slot 72 may include a detent or lock portion near a lower end that locks the slider 7 in place with the handle 5 in the closed position. Alternately, or additionally, the handle 5 may include a detent. This may help prevent unwanted movement of the cartridge holder 3 when the handle 5 is in the closed position, e.g., due to pressure in the cartridge, unless the handle 5 is purposely moved toward the open position.

Figure 5:
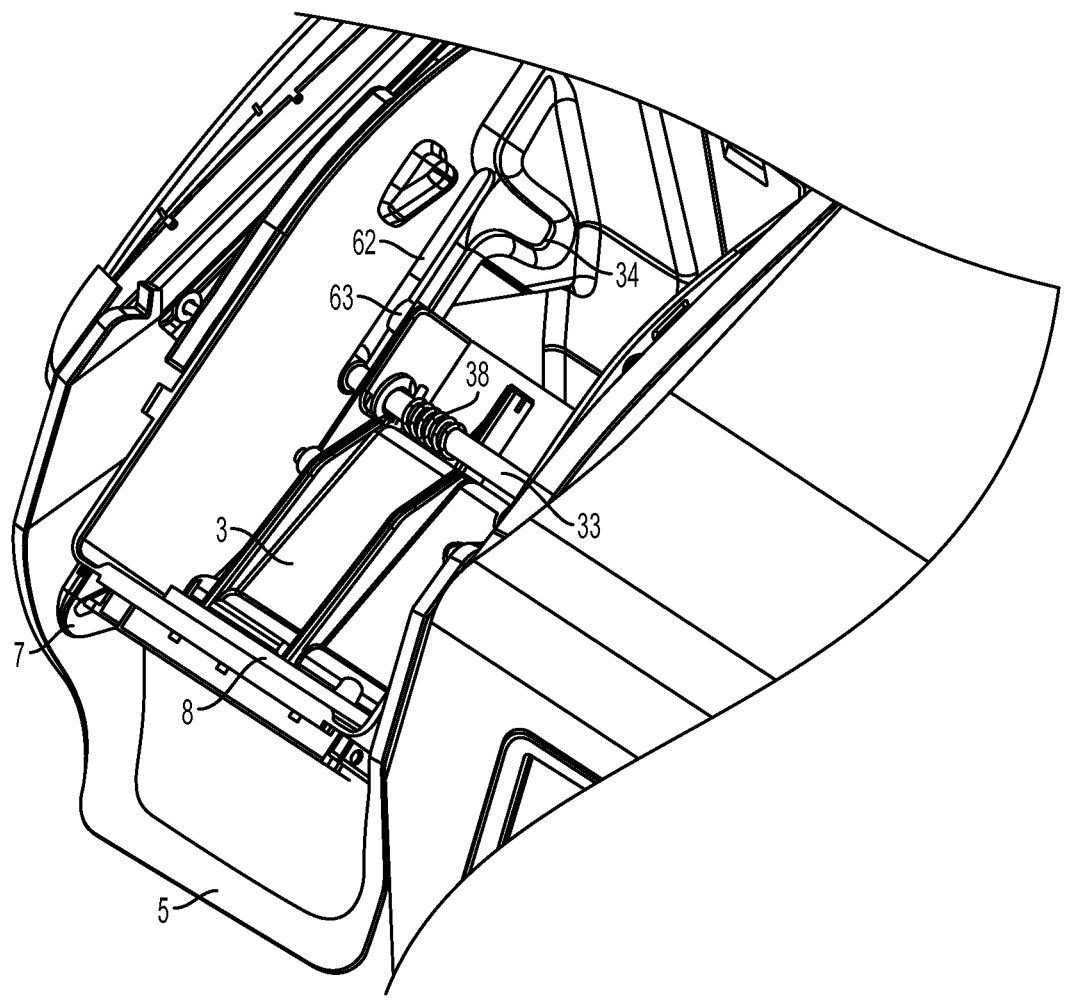
FIG. 5 is a top right perspective view of the cartridge holder in the FIG. 1 embodiment.

As can also be seen in dashed line in FIG. 4, a cam 34 is formed in a portion of the frame 6 and has an L-shape with a downwardly extending portion. A cam follower 63 attached to the cartridge holder 3 rides along the cam 34 as the cartridge holder 3 moves along the linear path of the slot 62 and causes the cartridge holder 3 to rotate about the pivot pin 33 when the cam follower 63 moves downwardly into the downwardly extending portion of the cam 34. FIG. 5 shows a top perspective view from the front right side of the beverage forming machine 10 and more clearly shows the cam 34, cam follower 63 and first slot 62. In this embodiment, the cartridge holder 3 also includes a torsion spring 38 that biases the cartridge holder 3 to rotate upwardly about to the pivot pin 33 (or pivot axis 32) toward the open position. Thus, in this embodiment, engagement of the cam follower 63 with the cam 34 does not actually drive rotation of the holder 3 toward the open position. Instead, the cam follower 63 and cam 34 control the holder's rotation toward the open position as driven by the spring 38. However, as the pivot pin 33 moves forwardly along the slot 62, the cam 34 and cam follower 63 drive the rotation of the cartridge holder 3 downwardly toward the closed position. Of course, the cam 34 could be arranged to drive rotation of the cartridge holder 3 both upwardly and downwardly, e.g., by capturing the cam follower 63 on both top and bottom sides in a cam groove. Regardless, whether the cam and cam follower drive movement of the holder 3 toward the open and/or closed position, the cam and cam follower are said to cause the rotation of the cartridge holder 3 between the open and closed position because without the presence of the cam and cam follower, the cartridge holder 3 would not rotate as described.

Figure 6:
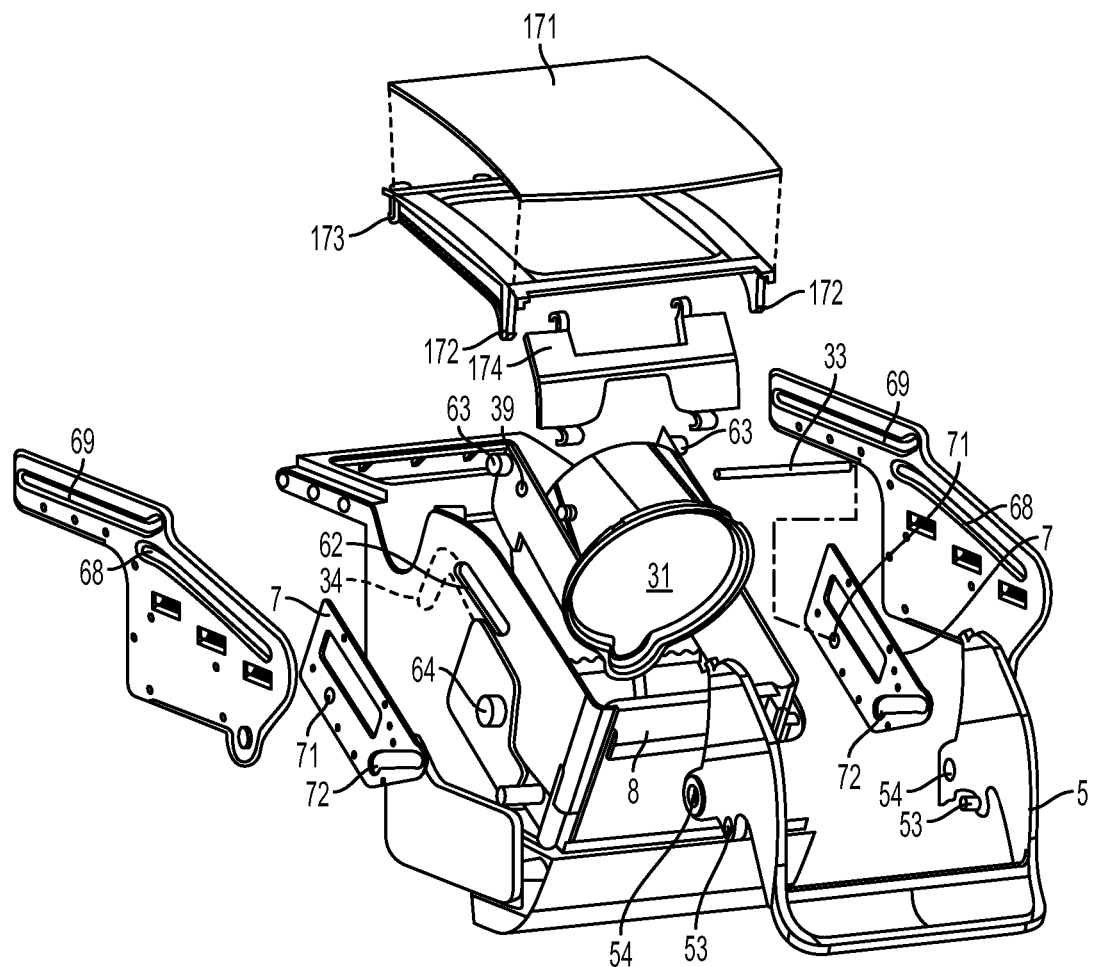
FIG. 6 is an exploded view of the cartridge holder mechanism in the FIG. 1 embodiment.

FIG. 6 shows an exploded view of this embodiment, and more clearly shows some elements of the cartridge holder mechanism. For example, holes 39 in the cartridge holder 3 are shown which receive the pivot pin 33. Thus, the pivot pin 33 in this embodiment extends across the width of the cartridge holder 3 from a slider 7 on the right side to a slider 7 on the left side and are fixed to the sliders 7 so the pivot pin 33 cannot rotate. As a result, one portion of the torsion spring 38 may be fixed to the pivot pin 33, allowing the spring 38 to bias the cartridge holder 3 (which is pivotally mounted to the pivot pin 33) toward the open position. The sliders 7 in this embodiment are formed as flat plates, but may be arranged in other ways. Also shown is the link 174 that connects the cartridge holder 3 to the door 171. The link 174 may be pivotally connected to both the cartridge holder 3 (e.g., at the pivot pin 33 or other location such as at a pair of pins extending from the sides of the holder 3) and the door 171 (e.g., at pins formed on an underside of the door 171). Alternately, the door 171 could be coupled to the sliders 7 or other component that drives movement of the door 171 between its open and closed positions.

In accordance with an aspect of the invention, motion of the cartridge holder may be damped in at least a portion of its movement between the open and closed positions. For example, in some embodiments, if the handle or other actuator is moved rapidly to open or close the cartridge holder, the cartridge holder and any cartridge held by the to holder may rotate rapidly. Such rapid motion may dislodge the cartridge from the holder, and/or throw liquid or other materials from the cartridge. For example, after a cartridge is used to make a beverage, some amount of liquid may be located near a top of the cartridge. Rapid rotation of the cartridge, e.g., during movement of the cartridge holder to the open position, may throw the liquid from the cartridge. By damping movement of the cartridge holder during at least a portion of its movement toward the open position, rotational movement of the cartridge may be slowed, preventing or otherwise reducing the likelihood that any liquid or other material may be thrown from the cartridge or that the cartridge is dislodged from the holder.

Figure 7:
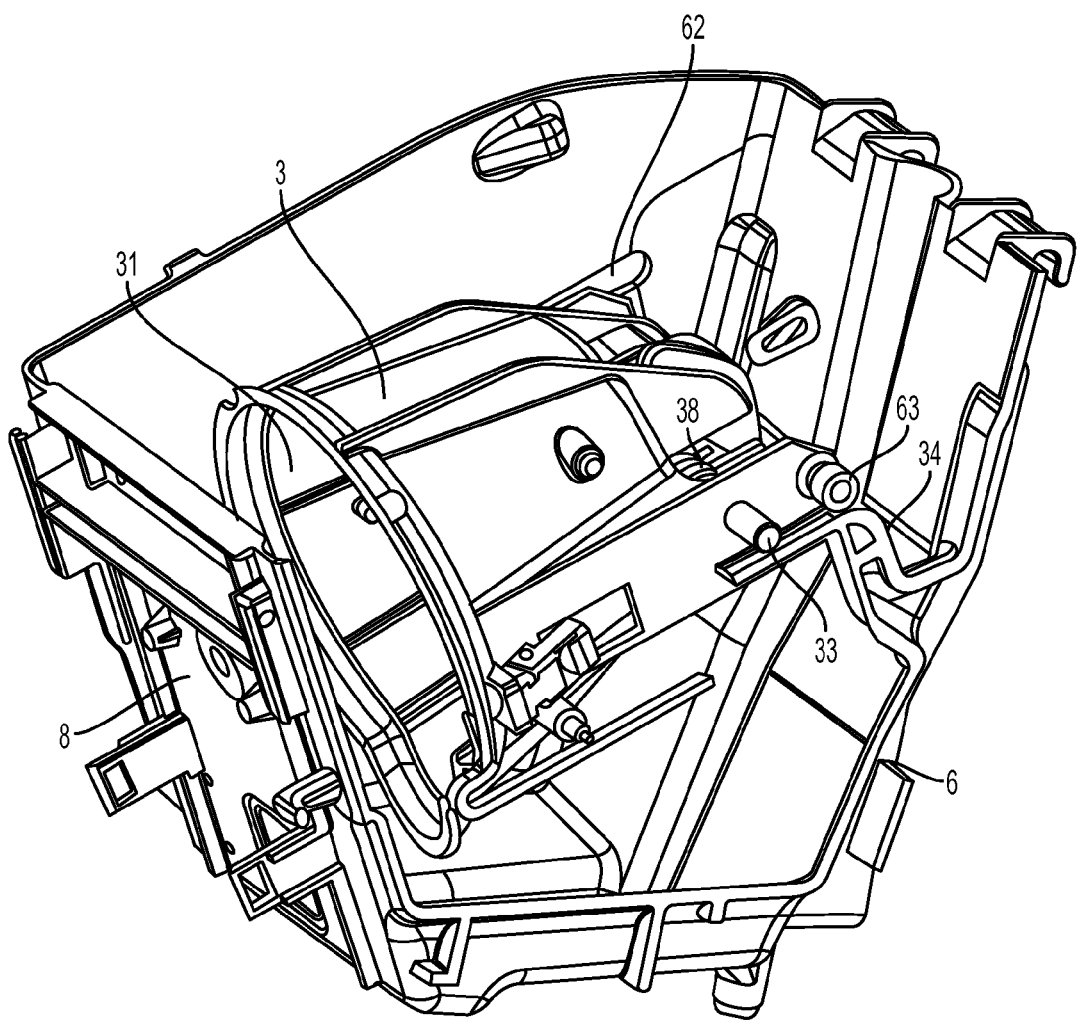
FIG. 7 shows a right side partial cut away view of the cartridge holder mechanism of the FIG. 1 embodiment with the cartridge holder in the closed position.
Figure 8:
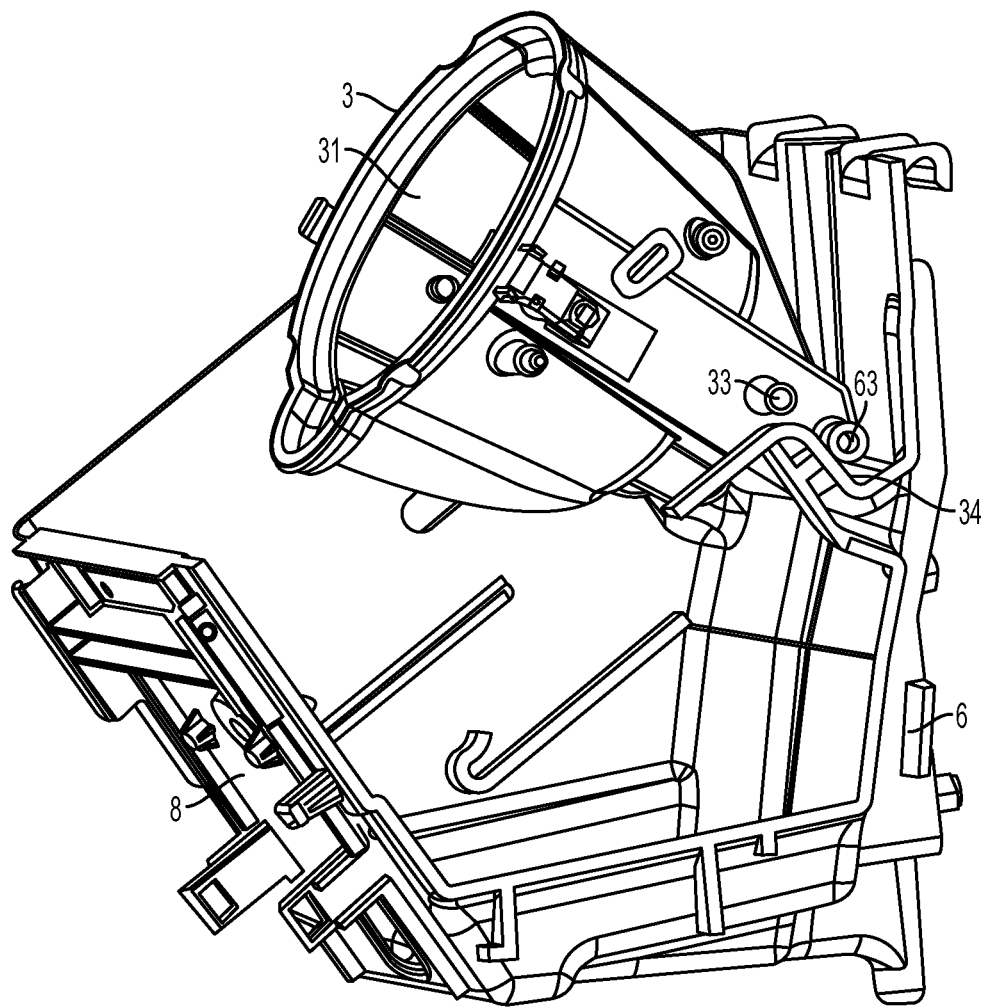
FIG. 8 shows a right side partial cut away view of the cartridge holder mechanism of the FIG. 1 embodiment with the cartridge holder moving toward the open position.

FIGS. 7 and 8 show a right side partial cut away view of the cartridge holder in the closed position and moving toward the open position, respectively. As described above, the cam follower 63 is engaged with the front, linear portion of the "L" shaped cam 34 with the cartridge holder in the closed position, as shown in FIG. 7. However, movement of the pivot pin 33 rearwardly along the slot 62 allows the cam follower 63 on the cartridge holder 3 to clear the linear portion of the cam 34 and move downwardly into the lower, rear portion of the cam 34, as shown in FIG. 8. This allows the torsion spring 38 to pivot the cartridge holder 3 toward the open position. As will be understood, rapid movement of the pivot pin 33 rearwardly will allow the cam follower 63 to clear the forward portion of the cam 34 and drop rapidly into the rear, lower portion of the cam 34 as the spring 38 biases the cartridge holder 3 toward to the open position.

Figure 9:
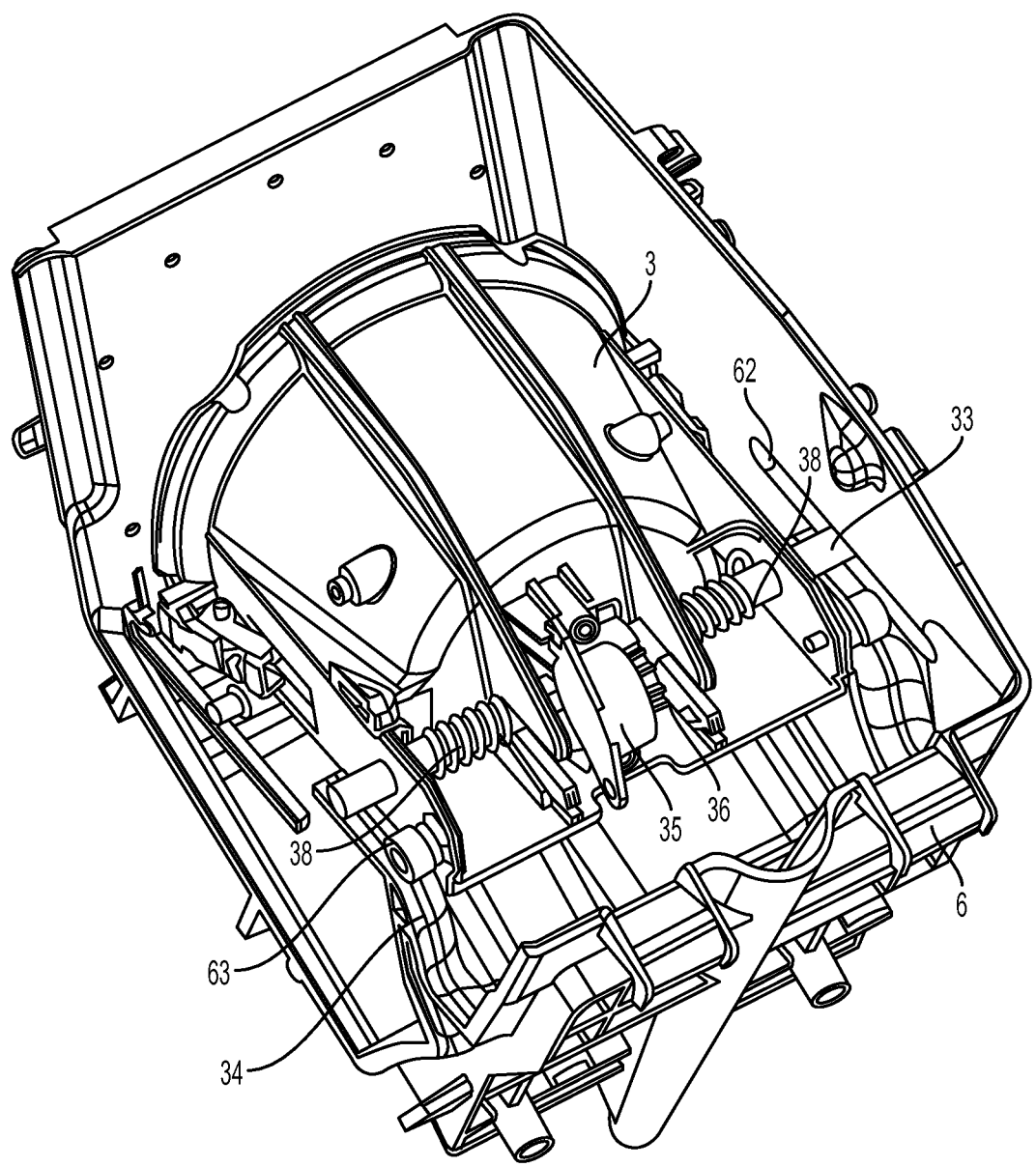
FIG. 9 is a rear partial cut away view of the cartridge holder mechanism including a rotational damper in an illustrative embodiment.
Figure 10:
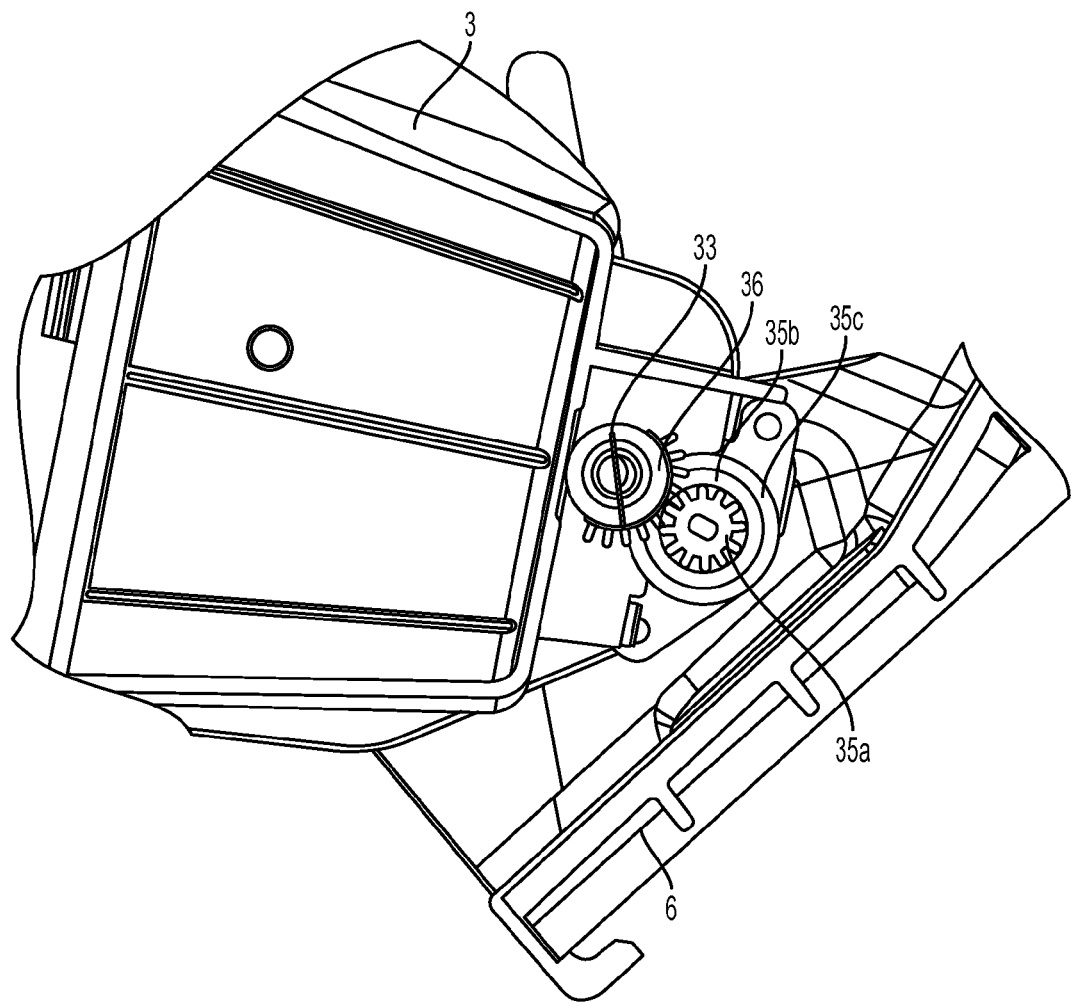
FIG. 10 right side partial cut away view of the cartridge holder mechanism of the FIG. 9 embodiment showing the rotational damper.

To slow the rotation of the cartridge holder 3, a rotational damper 35 may be provided as seen in FIGS. 9 and 10. While the rotational damper 35 may be arranged in a variety of ways, in this embodiment, the rotational damper 35 includes a gear 35a mounted to the cartridge holder 3 that engages a sector gear 36 fixed to the pivot pin 33. Thus, rotation of the cartridge holder 3 about the pivot pin 33 causes the gear 35a to rotate relative to the cartridge holder 3 due to its engagement with the sector gear 36. The gear 35a is mounted to pivot relative to the cartridge holder 3, but its rotation is damped by frictional engagement of an inner hub 35b (which is fixed to the gear 35a) with an outer hub 35c (which is fixed to the cartridge holder 3). As a result, while the gear 35a can rotate relative to the cartridge holder 3, its rotation is damped so that the rotation of the cartridge holder 3 relative to the frame 6 is damped. This allows the to cartridge holder 3 to rotate towards the open position under the force of the torsion springs 38, but the rotational movement is slowed so as not to exceed a particular angular velocity.

It will be appreciated that movement of the cartridge holder between the open and closed positions may be damped in any suitable way. For example, rotation of the cartridge holder may be damped in one direction only (e.g., from closed to open) rather than in both directions of rotation (e.g., from closed to open, and from open to closed). Also, the rotational damper 35 may be arranged in other suitable ways, such as by a device similar to that shown in FIGS. 9 and 10, but employing frictionally engaged discs rather than hubs. In another embodiment, the rotational damper 35 may include a linear damping element (similar to an automobile shock absorber) having one end attached to the frame 6 and another end attached to the cartridge holder 3. This linear damping element may resist rapid rotation of the cartridge holder 3 relative to the frame 6. In yet another embodiment, a linear damping element may be arranged with one end attached to the frame 6 and another attached to the pivot pin 33. In this configuration, the damping element may resist rapid movement of the pivot pin 33 relative to the slot 62, thereby preventing the cam follower 63 from rapidly clearing the cam 34. Thus, rapid rotation of the cartridge holder 3 may be resisted by resisting rapid movement of the pivot pin 33 relative to the slot 62.

Figure 11:
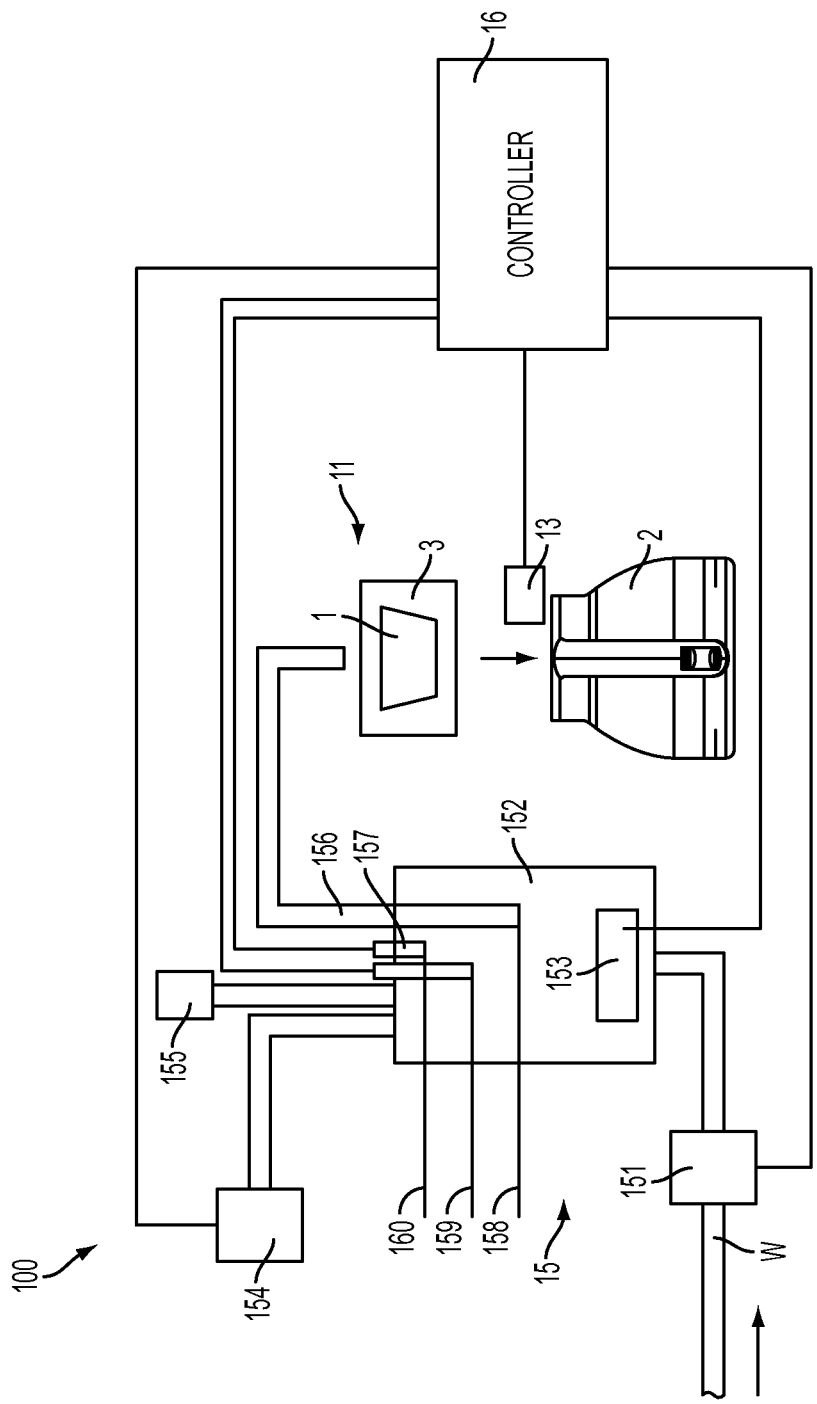
FIG. 11 is a schematic diagram of components of a beverage forming apparatus in an illustrative embodiment.

FIG. 11 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the container 2 via a beverage outlet.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank to 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels, or a single level, may be used.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151.

Although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends to downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

According to another aspect of the invention, a method for controlling operation of a beverage forming machine includes moving a pivot pin of a cartridge holder along a translational path relative to a frame of the beverage forming machine. This movement may be performed in a variety of ways, such as by rotating a handle or other actuator, causing a motor drive to move the pivot pin, actuating a pneumatic cylinder to drive the pivot pin, etc. Also, the pivot pin may follow a translational path by being guided via a slot, groove, track or other suitable feature. Of course, the translational path need not be completely linear, but may have some curve and/or include one or more curved sections.

A cam follower may be caused to move along a cam based on movement of the pivot pin along the translational path. For example, the cam follower may be fixed to the frame or the cartridge holder, and the cam may be fixed to the other of the frame or the cartridge holder. Thus, movement of the pivot pin of the cartridge holder along the translational path may cause the cam and cam follower to move relative to each other such that the cam follower follows a curve or other shape of the cam.

The cartridge holder may be pivoted about a pivot axis defined by the pivot pin based on movement of the cam follower relative to the cam and movement of the pivot pin along the translational path. For example, linear movement of the pivot pin along the translational path may cause the cam and cam follower to engage so as to cause rotation of the cartridge holder about the pivot pin. As a result, the cartridge holder may move linearly and rotationally in at least some portions of the cartridge holder's movement between an open position and a closed position. For example, the cartridge holder may move only translational near the closed position, and move translational and rotationally near the open position.

Rotation of the cartridge holder in at least one direction, e.g., from closed to open, may be powered by a torsion spring or other drive element. Also, rotation of the cartridge holder may be damped in at least one rotational direction in at least a portion of the holder's movement. For example, a rotational damper may be provided that damps rotation of the cartridge holder in at least a portion of its movement from the closed to the open position.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is to configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus, comprising:
a frame arranged to support components of the beverage forming apparatus;
a cartridge holder including an opening arranged to receive and hold a cartridge with the cartridge holder in an open position, the cartridge holder including a pivot pin defining a pivot axis about which the cartridge holder is arranged to pivot between open and closed positions;
a cam and a cam follower engaged between the frame and the cartridge holder and arranged to cause the cartridge holder to pivot about the pivot axis;
an actuator arranged to cause the cam follower to move along the cam and pivot the cartridge holder between the open and closed positions; and
a damper engaged with the cartridge holder to damp rotation of the cartridge holder in movement of the cartridge holder between the open and closed positions, the damper being distinct from the frame and being interconnected between the cartridge holder and the frame.

2. The apparatus of claim 1, wherein the pivot pin is movable along a translational path.

3. The apparatus of claim 2, wherein movement of the pivot pin along the translational path causes the cam to move along the cam.

4. The apparatus of claim 3, wherein the actuator is arranged to move the pivot pin along the translational path.

5. The apparatus of claim 1, wherein the opening of the cartridge holder faces toward a front of the beverage forming apparatus and is oriented in an upwardly inclined position with the cartridge holder in the open position.

6. The apparatus of claim 1, wherein the cam includes an L-shaped cam groove fixed to the frame.

7. The apparatus of claim 6, wherein the cam follower is fixed to the cartridge holder and is positioned rearwardly of the pivot axis with the cartridge holder in the closed position.

8. The apparatus of claim 7, wherein the cam follower is positioned below the pivot axis with the cartridge holder at the open position.

9. The apparatus of claim 1, wherein the cartridge holder further includes a spring to bias the cartridge holder to pivot about the pivot axis toward the open position.

10. The apparatus of claim 1, further comprising a lid fixed relative to the frame and arranged to cooperate with the cartridge holder to cover the opening of the cartridge holder with the cartridge holder in the closed position.

11. The apparatus of claim 1, wherein the cam follower is fixed relative to the frame and the cam is fixed relative to the cartridge holder.

12. The apparatus of claim 1, wherein the damper damps rotation of the cartridge holder about the pivot axis in movement from the closed position to the open position, and in movement from the open position to the closed position.

13. The apparatus of claim 1, wherein the damper includes a gear pivotally mounted to the cartridge holder, the gear being damped in rotation relative to the cartridge holder.

14. The apparatus of claim 13, comprising a gear mounted to the pivot pin that engages the gear of the damper.

15. The apparatus of claim 1, wherein the cam and cam follower are arranged to drive rotation of the cartridge holder toward the closed position only.

16. The apparatus of claim 15, wherein the cartridge holder further includes a torsion spring engaged with the pivot pin to bias the cartridge holder to pivot about the pivot axis toward the open position.

17. The apparatus of claim 1, wherein the opening is oriented in a downwardly inclined position with the cartridge holder in the closed position.

\* \* \* \* \*